(12) United States Patent
Bergman

(10) Patent No.: US 12,398,496 B2
(45) Date of Patent: Aug. 26, 2025

(54) APPARATUS AND METHOD FOR MANUFACTURING MINERAL WOOL AS WELL AS A MINERAL WOOL PRODUCT

(71) Applicant: PAROC GROUP OY, Helsinki (FI)

(72) Inventor: Niklas Bergman, Parainen (FI)

(73) Assignee: PAROC GROUP OY, Helsinki (FI)

( * ) Notice: Subject to any disclaimer, the term of this patent is extended or adjusted under 35 U.S.C. 154(b) by 0 days.

(21) Appl. No.: 18/149,694

(22) Filed: Jan. 4, 2023

(65) Prior Publication Data

US 2023/0183897 A1 Jun. 15, 2023

Related U.S. Application Data

(63) Continuation of application No. 16/643,330, filed as application No. PCT/FI2018/050607 on Aug. 28, 2018, now Pat. No. 11,572,645.

(30) Foreign Application Priority Data

Sep. 1, 2017 (FI) .................................. 20175788

(51) Int. Cl.
*D04H 1/4226* (2012.01)
*C03B 37/04* (2006.01)
*C03B 37/06* (2006.01)
*D04H 1/732* (2012.01)

(52) U.S. Cl.
CPC ......... *D04H 1/4226* (2013.01); *C03B 37/045* (2013.01); *C03B 37/048* (2013.01); *C03B 37/06* (2013.01); *D04H 1/732* (2013.01)

(58) Field of Classification Search
None
See application file for complete search history.

(56) References Cited

U.S. PATENT DOCUMENTS

| | | | |
|---|---|---|---|
| 2,255,227 A | 9/1941 | Parsons | |
| 2,318,244 A | 5/1943 | McClure | |
| 2,897,874 A | 8/1959 | Stalego et al. | |
| 2,991,507 A | 7/1961 | Levecque et al. | |
| 3,331,669 A * | 7/1967 | Sinclair ............... | D04H 1/4218 65/456 |
| 3,824,086 A | 7/1974 | Perry et al. | |

(Continued)

FOREIGN PATENT DOCUMENTS

| | | |
|---|---|---|
| EP | 1086054 B1 | 11/2004 |
| GB | 2172281 B | 11/1988 |

(Continued)

OTHER PUBLICATIONS

International Search Report and Written Opinion from PCT/FI2018/050607 dated Oct. 30, 2018.

(Continued)

*Primary Examiner* — Queenie S Dehghan
(74) *Attorney, Agent, or Firm* — Calfee, Halter & Griswold LLP

(57) ABSTRACT

An apparatus for and a method of manufacturing mineral wool are disclosed, wherein multiple fiberizing devices form discrete groups of mineral wool fibers that are separately conveyed to a common collection device. When the groups (Continued)

of mineral wool fibers are conveyed through separate channels, the channels can differ by shape and/or size, as well as location relative to the collection device.

13 Claims, 2 Drawing Sheets

(56) References Cited

U.S. PATENT DOCUMENTS

| | | | |
|---|---|---|---|
| 3,865,566 A * | 2/1975 | Kleist | C03B 37/048 |
| | | | 425/8 |
| 4,347,070 A * | 8/1982 | Levecque | D04H 3/03 |
| | | | 65/528 |
| 4,507,197 A | 3/1985 | Koenig et al. | |
| 4,759,974 A | 7/1988 | Barthe et al. | |
| 5,523,032 A | 6/1996 | Ault et al. | |
| 5,955,011 A | 9/1999 | Clocksin et al. | |
| 6,675,445 B2 | 1/2004 | Naber et al. | |
| 2004/0132371 A1 | 7/2004 | Naber et al. | |
| 2006/0179892 A1 | 8/2006 | Horres et al. | |
| 2011/0111198 A1 | 5/2011 | Letourmy et al. | |
| 2012/0074249 A1 * | 3/2012 | Evans | D04H 1/4218 |
| | | | 241/24.29 |
| 2012/0251796 A1 | 10/2012 | Potter et al. | |
| 2014/0076000 A1 | 3/2014 | Johnson | |
| 2014/0364031 A1 * | 12/2014 | Haley | D04H 3/004 |
| | | | 442/388 |

FOREIGN PATENT DOCUMENTS

| | | |
|---|---|---|
| WO | 8706631 A1 | 11/1987 |
| WO | 2006070056 A1 | 7/2006 |
| WO | 2015142294 A1 | 9/2015 |

OTHER PUBLICATIONS

International Preliminary Report on Patentability from PCT/FI2018/050607 dated Sep. 17, 2019.
Office Action from CN Application No. 201880070676.4 dated Nov. 19, 2021.
Office Action from U.S. Appl. No. 16/643,330 dated Jan. 28, 2022.
Office Action from U.S. Appl. No. 16/643,330 dated Jun. 29, 2022.
Notice of Allowance from U.S. Appl. No. 16/643,330 dated Oct. 5, 2022.

* cited by examiner

APPARATUS AND METHOD FOR MANUFACTURING MINERAL WOOL AS WELL AS A MINERAL WOOL PRODUCT

CROSS-REFERENCE TO RELATED APPLICATIONS

This application is a continuation of U.S. application Ser. No. 16/643,330, filed Feb. 28, 2020, which is the U.S. national stage entry of International Application No. PCT/FI2018/050607, filed Aug. 28, 2018, which claims priority to and the benefit of Finnish Application No. 20175788, filed Sep. 1, 2017, the entire contents of which are incorporated by reference herein.

FIELD

The present invention relates to an apparatus for manufacturing mineral wool. The invention further relates to a method for manufacturing mineral wool.

BACKGROUND

Such mineral wool manufacturing lines are implemented with various configurations. In order to manufacture mineral wool (rock wool and glass wool), the raw material is melted in a melting furnace and led into a fiberizing device, from which it is brought into the collecting apparatus. The manufacture of rock wool typically includes a collection chamber for the fibres formed, and means for collecting the fibres into a fibre mat or web. Such a fibre mat or web, which is often called a primary mat, is then brought into the pendulum apparatus, in which is formed a secondary mat of the desired thickness.

In the manufacture of glass wool, the fiberizing apparatus is typically a plate rotationally arranged around an axis, to the peripheral edge of which plate are arranged numerous small-diameter holes. The number of holes can be even tens of thousands and their diagonal can be, for example, in the range of 0.5 mm-1 mm. The molten material led onto the plate pushes through the holes under the influence of centrifugal force, forming fibres. Around the plate is led a blowing medium, oriented substantially parallel with the axis of rotation from above to below, which can be, for example, heated air. This blowing causes the fibres to orientate downwards and to stretch, thus thinning them. The fibres are led by the blowing medium to a transportation base passing the blowing medium through, onto which base the fibres are settled into a mat-like or a web-like product to be brought for further processing. Such a fiberizing plate is typically used in the manufacture of glass wool. Such a fiberizing plate is presented, for example, in U.S. Pat. No. 2,991,507.

In the manufacture of rock wool are typically used, arranged rotationally around a horizontal axis, a group of spinner discs (fiberization ring/spinner disc), in which material spins under the influence of centrifugal force and forms fibres. Around the spinner discs is led horizontally-oriented blowing medium to stretch and orient the fibres horizontally towards the collection chamber, into which are arranged collector elements to collect the fibres into a mat or web. Such an arrangement is known, for example, from WO87/06631.

A disadvantage, especially when using spinner discs, is a significantly great amount of non-fiberized material (shot), which can be as much as 40% by weight from the weight of the source material. There are various solutions for separating the shot from the fibres, but nonetheless a significant amount of them ends up in the final product, weakening its quality and increasing its weight.

SUMMARY

The object of the present invention is to provide a solution, with which the creation of this shot can be effectively prevented and, at the same time, to provide an adequately high production output as well as high-grade and homogenous product quality.

In order to achieve this object, an apparatus for manufacturing mineral wool and a method of manufacturing mineral wool according to the invention are provided.

In one exemplary embodiment, an apparatus for manufacturing mineral wool is provided. The apparatus comprises: means for producing molten mineral material; at least one fiberizing device for forming fibres, into which fiberizing device the molten mineral material is fed and by which fibres are formed, the fiberizing device comprising, rotationally arranged around a vertical axis, at least one fiberizing plate having a vertical peripheral edge, into which are formed a plurality of holes through which the molten material is led by centrifugal force to form fibres, wherein to the fiberizing device are arranged elements to produce a vertical flow of blowing medium to be led around the fiberizing plate, the flow causing the fibres to turn downwards and, at the same time, to thin; a collection device arranged downstream of the fiberizing device, into which the formed fibres are led and collected into a mat-like material; wherein the apparatus includes at least two fiberizing devices, and that in connection with said at least one fiberizing plate of each fiberizing device is arranged a conveying device, where the fibres are brought before reaching the collection device.

In one exemplary embodiment, a method of manufacturing mineral wool is provided. The method comprises: producing molten mineral material; feeding the molten mineral material into at least two fiberizing devices; forming fibres using the at least two fiberizing devices; thinning the fibres using a flow of blowing medium; feeding the thinned fibres from the at least two fiberizing devices via a conveying device arranged with each fiberizing device to a common collection device located downstream of the at least two fiberizing devices; and collecting the thinned fibres on the common collection device to form a primary fibre mat.

In one exemplary embodiment, an apparatus for manufacturing mineral wool is provided. The apparatus comprises: means for producing molten mineral material; at least one fiberizing device for forming fibres, into which fiberizing device the molten mineral material is fed and by which fibres are formed, the fiberizing device comprising, rotationally arranged around a vertical axis, at least one fiberizing plate having a vertical peripheral edge, into which are formed a plurality of holes through which the molten material is led by centrifugal force to form fibres, wherein to the fiberizing device are arranged elements to produce a vertical flow of blowing medium to be led around the fiberizing plate, the flow causing the fibres to turn downwards and, at the same time, to thin; a collection device arranged downstream of the fiberizing device, into which the formed fibres are led and collected into a mat-like material; wherein the apparatus includes at least two fiberizing devices placed at different height levels with each other and/or at different horizontal distances from the collection device, and that in connection with said at least one fiberizing plate of each fiberizing device is arranged a conveying device, where the fibres are brought before reaching the collection device.

In one exemplary embodiment, a method of manufacturing mineral wool is provided. The method includes using an apparatus, which includes means for producing molten mineral material, at least one fiberizing device for forming fibres, into which fiberizing device the molten mineral material is fed and by which fibres are formed, the fiberizing device comprising, rotationally arranged around a vertical axis, at least one fiberizing plate having a vertical peripheral edge, into which are formed a plurality of holes, through which the molten material is led by centrifugal force to form fibres, wherein into the fiberizing device are arranged elements to produce an annular flow of blowing medium directed vertically downwards around the fiberizing plate, the flow causing the fibres to turn downwards and to thin, as well as a collection device arranged downstream the fiberizing device, into which the formed fibres are led and collected into a mat-like material, wherein at least two fiberizing devices are arranged to feed fibres into a common collection device, the fiberizing devices being placed at different height levels with each other and/or at different horizontal distance from the collection device, and that in connection with the fiberizing plate of each fiberizing device is arranged a conveying device where the fibres are brought and by means of which the fibres are conveyed into the collection device to form a primary fibre mat or web.

In one exemplary embodiment, a method of manufacturing mineral wool is provided. The method includes using an apparatus, which includes means for producing molten mineral material, at least one fiberizing device for forming fibres, into which fiberizing device the molten mineral material is fed and by which fibres are formed, the fiberizing device comprising, rotationally arranged around a vertical axis, at least one fiberizing plate having a vertical peripheral edge, into which are formed a plurality of holes, through which the molten material is led by centrifugal force to form fibres, wherein into the fiberizing device are arranged elements to produce an annular flow of blowing medium directed vertically downwards around the fiberizing plate, the flow causing the fibres to turn downwards and to thin, as well as a collection device arranged downstream the fiberizing device, into which the formed fibres are led and collected into a mat-like material, wherein at least two fiberizing devices are arranged to feed fibres into a common collection device, and that in connection with the fiberizing plate of each fiberizing device is arranged a conveying device where the fibres are brought and by means of which the fibres are conveyed into the collection device to form a primary fibre mat or web.

In one exemplary embodiment, a mineral wool product is provided. The mineral wool product is produced in accordance with a method of the present disclosure. In one exemplary embodiment, the mineral wool product comprises a plurality of mineral fibers and binder, and a fiber content of at least 90% based on at least one of the following standards: 1) Eurima 5 (Oct. 5, 1967); 2) BS 2972:1975; 3) ASTM C 612-83; or 4) JIS A 9504-1984. In one exemplary embodiment, the mineral wool product comprises a plurality of mineral fibers and binder, and a transverse tensile strength of the mineral wool product is greater than a linear tensile strength of the mineral wool product.

BRIEF DESCRIPTION OF THE DRAWINGS

In the following, the invention is described in more detail with reference to the accompanying figures, in which.

DETAILED DESCRIPTION

Figure 1:
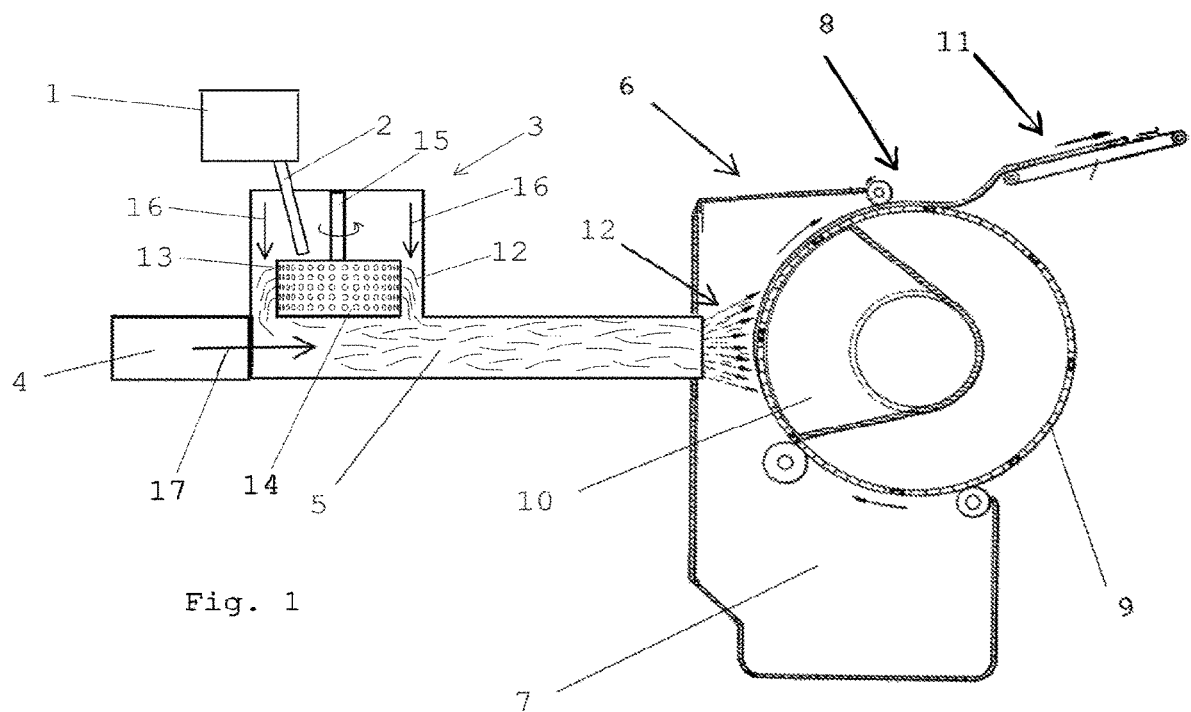
FIG. 1 shows a schematic illustration of an embodiment of an apparatus according to the invention.

Reference numeral 1 in FIG. 1 denotes a melting furnace, from which the molten material is led along a trough 2 into a fiberizing device 3. The fiberizing device 3 is equipped with a blower 4, which produces a flow 17 of blowing air, which transports the fibres 12 formed by the fiberizing device into the channel 5 and further into the collection device 6. The collection device 6 has a collection chamber 7 and collector elements 8, which, in this embodiment, comprise a collection drum 9 equipped with a perforated peripheral surface, inside which is a suction box 10. The blowing air moves through the holes of the drum 9 into the suction box and further away from the collection apparatus. This contributes to the collecting of the fibres 12 onto the surface of the drum 9 to form a primary fibre mat or web, which is then transported, for example, by a conveyor 11, to the pendulum device (not shown), in which it is formed into a secondary mat, which is then brought for further processing, for example, hardening. The collection chamber can as such be according to known art, or it can differ from known art. The feeding of binder is not shown in the figure. For example, the collection device can be a foraminous or perforated belt conveyor having suction boxes inside the belt loop.

The fiberizing device 3 comprises, rotating around a vertical axis 15, a cup-like plate 13, on the periphery of which are numerous small holes 14, through which the molten mass moves under the influence of centrifugal force forming fibres 12, which are stretched around the plate by vertically led blowing air 16, annularly surrounding the plate. In connection with the feeding of blowing air and the stretching of the fibres, binder and other necessary chemicals can be fed. Such a fiberizing plate and the production of blowing air, surrounding it annularly, in the manufacture of glass wool is prior known to the skilled person in the art, for example, from U.S. Pat. No. 4,759,974. The advantage in using such a fiberizing plate is that the majority of the mass can be fiberized. The disadvantage is that through one fiberizing device can be fed only approx. 400-500 kg molten mass per hour, which is significantly less than in solutions implemented with spinner discs, in which the fed amount of molten mass can be, for example, 5000-7000 kg per hour. In the solution according to the invention, in connection with the fiberizing device 3, preferably below it, is arranged a relatively small—diameter, horizontal channel 5 leading to the collection device, the length of which channel can be several metres, for example, in the range of approx. 1 m-approx. 10 m. In connection with the channel 5 is arranged a blower 4, which creates a horizontal air flow in the channel 5 directing the fibres 12, oriented downwards by the vertical blowing air 16 in the fiberizing device, horizontally along the channel 5 towards the collection device 6. By means of this channel solution, it is possible to place several fiberizing devices 3 to feed one collection device 6, wherein the production output can be increased to a desired level. The fiberizing devices can be placed at different height levels with each other and at different horizontal distance from the collection device 6, wherein only the channels 5 need to be adapted to the inlet port of the collection device. The channels 5 do not need to all be the same shape or size, and their location in relation to the collection apparatus can also be modified.

Figure 2:
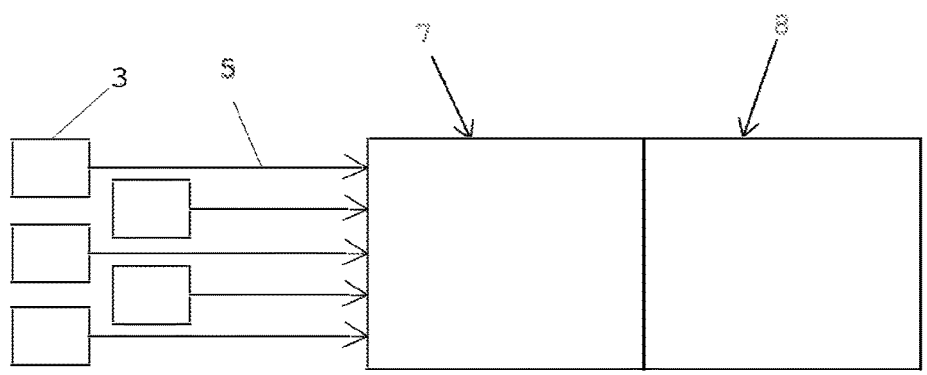
FIG. 2 shows a schematic illustration viewed from above of one possible embodiment of the placement of fiberizing devices with their channels.
Figure 3:
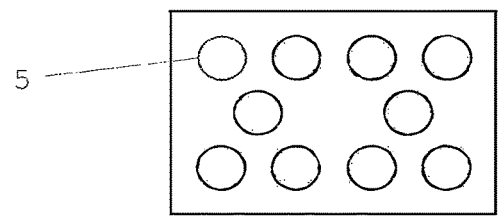
FIG. 3 shows a schematic illustration of an embodiment of the placement of the channels in the mouth of the collection device, the channels being connected to the fiberizing devices.

FIG. 2 shows as a schematic illustration viewed from above of one placement of the fiberizing devices 3 in relation to each other, as well as in relation to the collection chamber 7 and the collector elements 8. FIG. 3 shows schematically an example of one manner of placing the channels 5 in the mouth of the collection device 6 as viewed from the direction of the collection drum 9.

Figure 4:
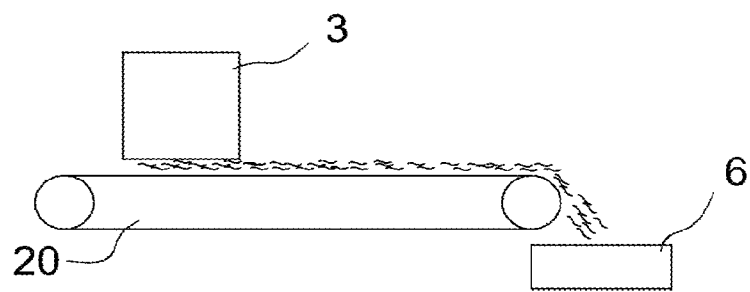
FIG. 4 shows a schematic illustration of an embodiment of the apparatus according to the invention where the conveying device is a belt.

FIG. 4 shows a schematic illustration of the apparatus wherein the conveying device comprises a belt 20 on which the fibres are deposited. The belt can be provided with suction boxes inside the belt loop to assist depositing of the fibres on the certain portion of upper run of the belt. For releasing the fibres into a collection device the belt is preferably without any suction means in the discharging area of the belt loop or there can be blower means for directing an air flow from inside the belt loop through the belt in the discharging area of the belt 20 to assist releasing of the fibres.

Figure 5:
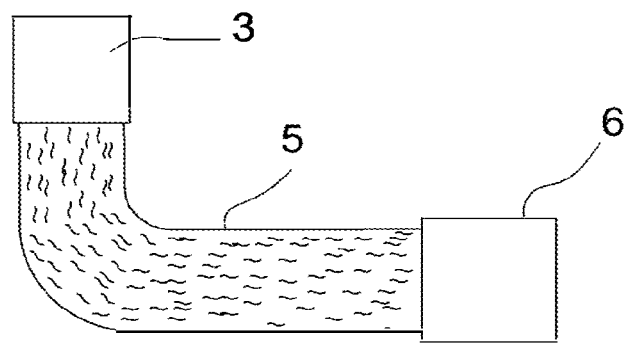
FIG. 5 shows a schematic illustration of an embodiment of the apparatus according to the invention where the conveying device comprises a curved channel.

FIG. 5 shows a schematic illustration of the apparatus wherein the conveying device 5 comprises a curved channel 5 through which the fibres are transported from a fiberizing device 3 to a collection device 6 by means of the blowing air directed vertically downwards around the fiberizing plate and/or by means of suction means arranged in the channel in the vicinity of the collection device.

Figure 6:
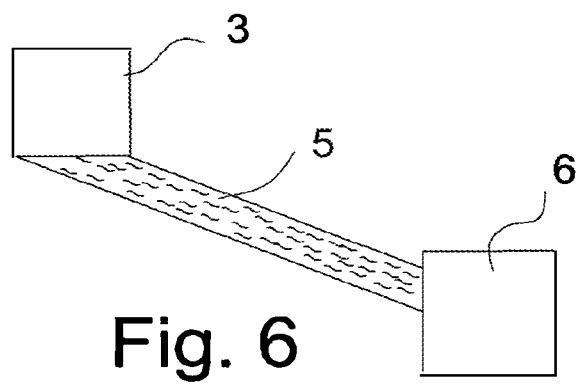
FIG. 6 shows a schematic illustration of an embodiment of the apparatus according to the invention where the conveying device comprises an inclined channel.

FIG. 6 shows a schematic illustration of the apparatus wherein the conveying device 5 comprises an inclined channel 5 through which the fibres are transported from a fiberizing device 3 to a collection device by means of the blowing air directed vertically downwards around the fiberizing plate and/or by means of suction means arranged in the channel in the vicinity of the collection device.

One or more fiberizing plates can be equipped with perforations of different size in relation to the other fiberizing plates, wherein different fiberizing plates can be used to produce fibres of different size. Furthermore, different fiberizing plates can be used to produce different fiberizing parameters, such as, for example, the rotation speed of the plate, the feeding rate of the molten material and/or the flow rate of the vertical blowing air, to vary in a desired manner the characteristics of the intermediate product and/or final product to be manufactured by the apparatus.

In the solution according to the invention, the fiberizing plates can be similar to or different from each other, i.e. their dimensions, such as, for example, the diameters of the fiberizing plates may differ from each other, and the fiberizing plates may also differ in their design (for example, the height and shape of the edges of the fiberizing plate).

By using the method according to the invention, it is possible to create a mineral wool product having a fibre content in excess of 90%, preferably in excess of 95%, based on the following standards or specifications:

1. Eurima 5 (Oct. 5, 1967), Determination of the content of non-fibrous material in mineral wool
2. BS 2972:1975, Method of test for inorganic thermal insulating material, Section 14
3. ASTM C 612-83, Annex, Shot content of unorganic fibrous thermal insulation
4. JIS A 9504-1984, Heat insulation made of Rockwool.

The method according to the invention enables the manufacture of a mineral wool product having the desired tensile strength characteristics, i.e. the transverse tensile strength of which is greater than the linear tensile strength.

The invention claimed is:

1. A method of manufacturing mineral wool, the method comprising:
   producing a molten mineral material;
   feeding the molten mineral material into a plurality of fiberizing devices including a first fiberizing device for forming a first group of fibers and a second fiberizing device for forming a second group of fibers, each of the fiberizing devices comprising, rotationally arranged around a vertical axis, a fiberizing plate having a vertical peripheral edge, into which are formed a plurality of holes, through which the molten material is led by centrifugal force to form the fibers;
   directing an annular flow of blowing medium downwards around each of the fiberizing devices to cause the fibers to turn downwards and to thin;
   conveying the first group of fibers by a first conveying means to a collection device; and
   conveying the second group of fibers by a second conveying means to the collection device; and
   forming a mat-like material in the collection device using the first group of fibers and the second group of fibers;
   wherein the collection device comprises a collection chamber, a collection drum having a perforated surface, and a suction box arranged inside of the collection drum; and
   wherein a height of the first fiberizing device relative to the collection device is different from a height of the second fiberizing device relative to the collection device.

2. The method of claim 1, wherein a distance of the first fiberizing device from the collection device is different from a distance of the second fiberizing device from the collection device.

3. The method of claim 1, wherein the first conveying means is a first channel; and
   wherein the second conveying means is a second channel.

4. The method of claim 3, wherein a length of the first channel is in the range of about 1 m to about 10 m; and
   wherein a length of the second channel is in the range of about 1 m to about 10 m.

5. The method of claim 3, wherein a length of the first channel is different from a length of the second channel.

6. The method of claim 3, wherein a size of the first channel is different from a size of the second channel.

7. The method of claim 3, wherein at least one of the first channel and the second channel includes a portion that is curved.

8. The method of claim 3, further comprising blowing air through at least one of the first channel and the second channel.

9. The method of claim 1, wherein the first conveying means and the second conveying means are not parallel to one another.

10. The method of claim 1, wherein the fiberizing devices further comprise a third fiberizing device for forming a third group of fibers, and
wherein the method further comprises conveying the third group of fibers by a third conveying means to the collection device.

11. The method of claim 10, wherein a shape of the third conveying means is the same as one of the shape of the first second conveying means and the shape of the second conveying means.

12. The method of claim 10, wherein the fiberizing devices further comprise a fourth fiberizing device for forming a fourth group of fibers, and
wherein the method further comprises conveying the fourth group of fibers by a fourth conveying means to the collection device.

13. The method of claim 1, wherein a shape of the first conveying means differs from a shape of the second conveying means.

* * * * *